(12) United States Patent
Deng

(10) Patent No.: US 11,359,825 B2
(45) Date of Patent: Jun. 14, 2022

(54) ENERGY STORAGE DEVICE, METHOD FOR STORING AND SUPPLYING ENERGY USING THE SAME

(71) Applicant: Guangxi Banshida Green Building Energy Saving Technology Co., Ltd., Liuzhou (CN)

(72) Inventor: Yining Deng, Liuzhou (CN)

(73) Assignee: GUANGXI BANSHIDA GREEN BUILDING ENERGY SAVING TECHNOLOGY CO., LTD., Liuzhou (CN)

( * ) Notice: Subject to any disclaimer, the term of this patent is extended or adjusted under 35 U.S.C. 154(b) by 55 days.

(21) Appl. No.: 17/110,262

(22) Filed: Dec. 2, 2020

(65) Prior Publication Data

US 2021/0080133 A1    Mar. 18, 2021

Related U.S. Application Data

(63) Continuation-in-part of application No. PCT/CN2019/091661, filed on Jun. 18, 2019.

(30) Foreign Application Priority Data

Jun. 28, 2018 (CN) .......................... 201810688570.2

(51) Int. Cl.
*F28D 15/00* (2006.01)
*F24F 5/00* (2006.01)
*F28D 20/02* (2006.01)

(52) U.S. Cl.
CPC ............ *F24F 5/0021* (2013.01); *F28D 20/02* (2013.01)

(58) Field of Classification Search
CPC ............................... F24F 5/0021; F28D 20/02
USPC ..................................................... 165/104.22
See application file for complete search history.

(56) References Cited

U.S. PATENT DOCUMENTS

| 8,667,804 B2* | 3/2014 | Koh ...................... F28D 20/028 62/130 |
| 2012/0037342 A1* | 2/2012 | Holloway ............. F24F 5/0021 165/104.21 |
| 2012/0055661 A1* | 3/2012 | Feher .................... F28D 20/021 165/181 |
| 2018/0017337 A1* | 1/2018 | Desgrosseilliers ......................... F28D 20/0034 |
| 2018/0195741 A1* | 7/2018 | Field ...................... F28D 20/02 |

* cited by examiner

*Primary Examiner* — Davis D Hwu
(74) *Attorney, Agent, or Firm* — Matthias Scholl P.C.; Matthias Scholl

(57) ABSTRACT

An energy storage device includes a phase-change energy storage tank, a first liquid inlet pipe, a first liquid outlet pipe, a second liquid inlet pipe, a second liquid outlet pipe, and a pipeline. The phase-change energy storage tank includes a first housing and a second housing disposed in the first housing. The second housing includes a liquid inlet, a liquid outlet, a feeding hole, and a discharge hole. The first housing includes a thermal insulation material. The second housing includes a phase change material. The liquid inlet and the liquid outlet are disposed on two ends of the second housing, respectively. The phase change material is introduced to and discharged out of the second housing via the feeding hole and the discharge hole, respectively. The first liquid inlet pipe, the phase-change energy storage tank, and the first liquid outlet pipe are connected sequentially to form an energy storage unit.

4 Claims, 3 Drawing Sheets

ENERGY STORAGE DEVICE, METHOD FOR STORING AND SUPPLYING ENERGY USING THE SAME

CROSS-REFERENCE TO RELAYED APPLICATIONS

This application is a continuation-in-part of International Patent Application No. PCT/CN2019/091661 with an international filing date of Jun. 18, 2019, designating the United States, and further claims foreign priority benefits to Chinese Patent Application No. 201810688570.2 filed Jun. 28, 2018. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND

The disclosure relates to an energy storage device and a method for storing and supplying energy using the energy storage device.

Conventionally, the energy supply equipment consumes electrical energy to produce cold or heat energy for shopping malls, hotels and other places that need cooling and heating. The process is energy-consuming and leads to high operating costs.

SUMMARY

The disclosure provides an energy storage device, the device comprising a phase-change energy storage tank, a first liquid inlet pipe, a first liquid outlet pipe, a second liquid inlet pipe, a second liquid outlet pipe, and a pipeline. The phase-change energy storage tank comprises a first housing and a second housing disposed in the first housing. The second housing comprises a liquid inlet, a liquid outlet, a feeding hole, and a discharge hole. The first housing comprises a thermal insulation material, and the second housing comprises a phase change material. The liquid inlet and the liquid outlet are disposed on two ends of the second housing, respectively; the phase change material is introduced to and discharged out of the second housing via the feeding hole and the discharge hole, respectively.

The first liquid inlet pipe, the phase-change energy storage tank, and the first liquid outlet pipe are connected to each other sequentially to form an energy storage unit; the first liquid inlet pipe is provided with a first electric valve; the first liquid outlet pipe is provided with a second electric valve, a first intelligent temperature control sensor, and a circulating water pump; the first liquid inlet pipe is connected to the liquid inlet of the phase-change energy storage tank to supply cold/hot water to the phase-change energy storage tank, and the first liquid outlet pipe is connected to the liquid outlet of the phase-change energy storage tank to receive cold/hot water flowing out of the phase-change energy storage tank; the first intelligent temperature control sensor is configured to control the switch on/off of the first electric valve and the second electric valve; the second liquid inlet pipe, the phase-change energy storage tank, and the second liquid outlet pipe are connected to each other sequentially to form an energy supply unit; the second liquid inlet pipe is provided with a third electric valve, and the second liquid outlet pipe is provided with a fourth electric valve; the second liquid inlet pipe is connected to the liquid inlet of the phase-change energy storage tank; the second liquid outlet pipe is connected to the liquid outlet of the phase-change energy storage tank; and the pipeline is disposed between the second liquid inlet pipe and the second liquid outlet pipe; the third electric valve and the fourth electric valve are disposed between the pipeline and the phase-change energy storage tank; the pipeline is provided with a second intelligent temperature control sensor and a fifth electric valve; the second intelligent temperature control sensor is configured to control the switch on/off of the third electric valve, the fourth electric valve, and the fifth electric valve.

In a class of this embodiment, the phase-change energy storage tank further comprises a backup hole, so that when the liquid inlet breaks down, liquid is introduced to the phase-change energy storage tank via the backup hole.

The disclosure also provides a method for storing and supplying energy using the energy storage device, the method comprising:

1) in an energy storage stage, setting a temperature value, switching off the third electric valve and the fourth electric valve, switching on the first electric valve, the second electric valve, and the circulating water pump, allowing cold/hot water in the first liquid inlet pipe to enter the energy storage device where the cold/hot water exchanges heat energy with the phase change material in the second housing; sensing, by the first intelligent temperature control sensor, a liquid temperature in the first liquid outlet pipe, and when the liquid temperature reaches the temperature value, switching off the first electric valve, the second electric valve, and the circulating water pump, whereby the heat energy is stored in the phase-change energy storage tank; and 2) in an energy supply stage, setting a first temperature value and a second temperature value where the second temperature value is larger than the first temperature value; sensing, by the second intelligent temperature control sensor, a liquid temperature in the pipeline, when the liquid temperature is less than the first temperature value, switching on the fifth electric valve, whereby the pipeline, the second liquid inlet pipe, and the second liquid outlet pipe form a bypass circulation path to supply heat energy for an electrical appliance; when the second intelligent temperature control sensor senses the liquid temperature in the pipeline is larger than the second temperature value, switching off the fifth electric valve, and switching on the third electric valve and the fourth electric valve, whereby the phase-change energy storage tank, the second liquid inlet pipe, and the second liquid outlet pipe form a primary circulation path to supply heat energy for the electrical appliance.

In a class of this embodiment, the first temperature value is 12° C. and the second temperature value is 18° C.

The following advantages are associated with the energy storage device of the disclosure. The energy storage device is able to store cold/heat energy. Thus, when the power is cheap, for example, at night, the energy storage device operates to store a large amount of cold/heat energy, so that when the electricity price is high, such as the peak time of energy consumption, the energy storage device operates to supply the stored cold/heat energy for the electrical appliances, thus saving the energy consumption at the peak time and the operating costs.

DETAILED DESCRIPTION

To further illustrate, embodiments detailing an energy storage device and method for storing and supplying energy using the energy storage device are described below. It should be noted that the following embodiments are intended to describe and not to limit the disclosure.

Figure 1:
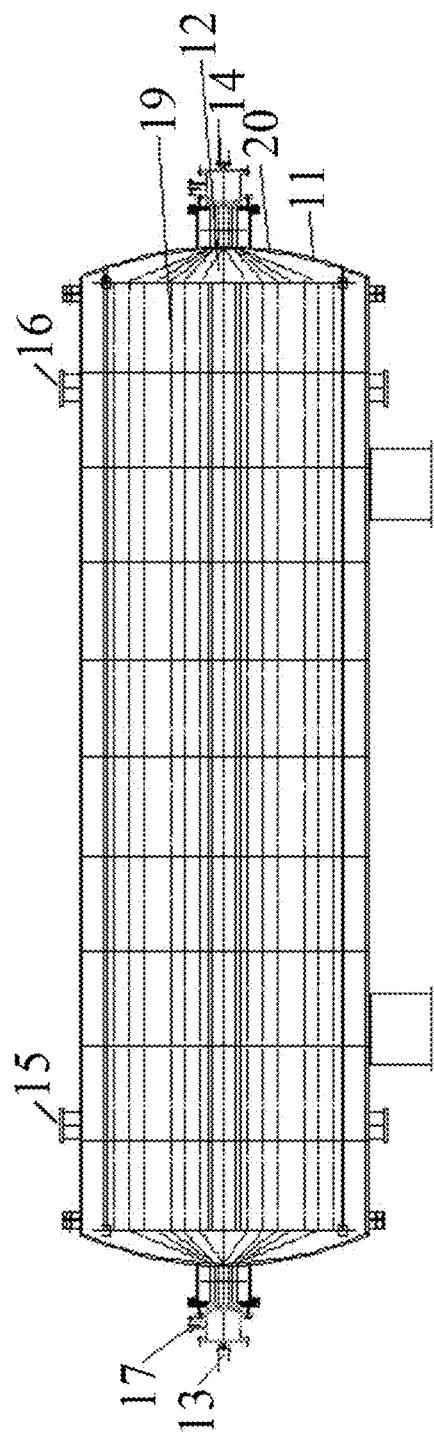
FIG. 1 is a schematic diagram of a phase-change energy storage tank according to one embodiment of the disclosure.
Figure 2:
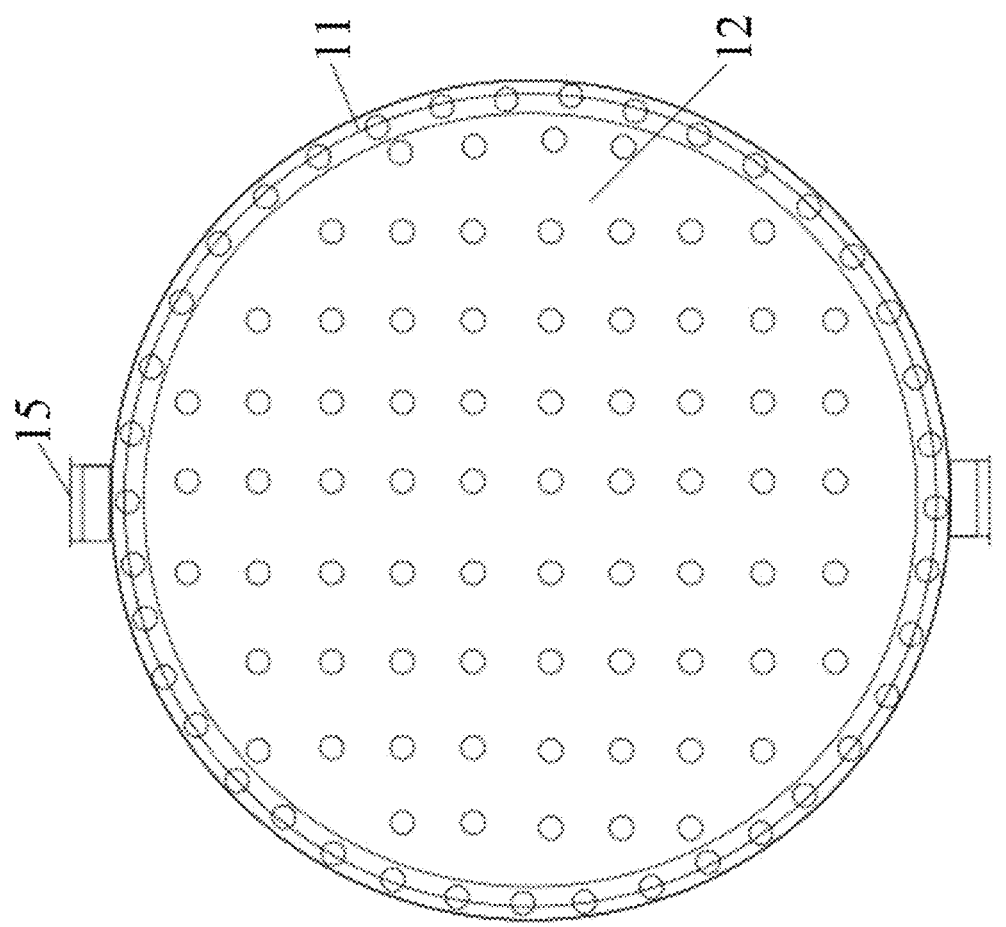
FIG. 2 is a side view of a phase-change energy storage tank according to one embodiment of the disclosure.

As shown in FIGS. 1 and 2, the disclosure provides a phase-change energy storage tank comprising a first housing 11 and a second housing 12 disposed in the first housing. The second housing 12 comprises a liquid inlet 13, a liquid outlet 14, a feeding hole 15, and a discharge hole 16. The first housing 11 is made of thermal insulation material 20, and the second housing 12 is filled with a phase change material 19. The liquid inlet 13 and the liquid outlet 14 being disposed on two ends of the second housing, respectively. The phase change material is introduced to and discharged out of the second housing 12 via the feeding hole 15 and the discharge hole 16, respectively. Optionally, the phase-change energy storage tank comprises a backup hole 17, and when the liquid inlet 13 breaks down, liquid is introduced to the phase-change energy storage tank via the backup hole.

Figure 3:
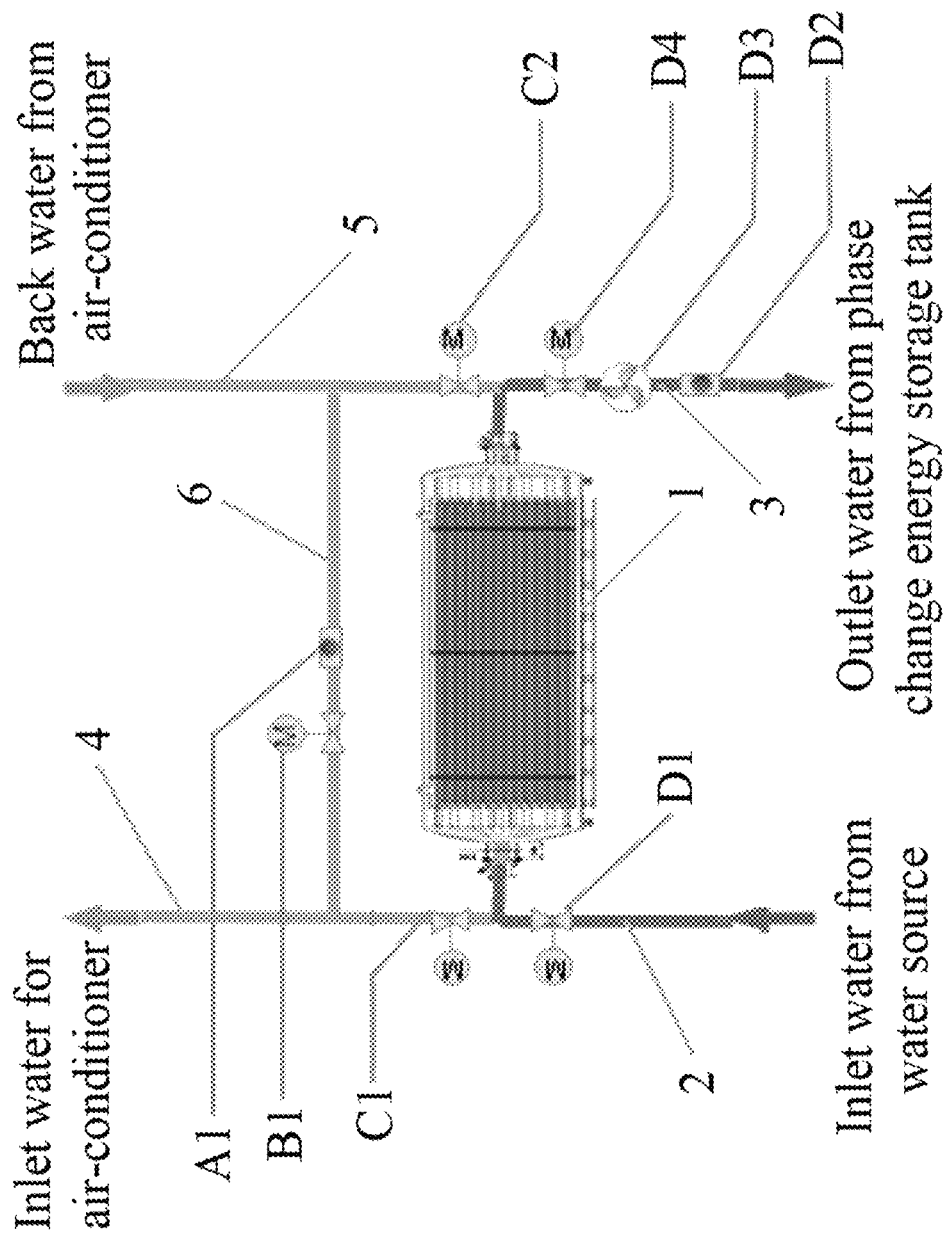
FIG. 3 is a schematic diagram of an energy storage device according to one embodiment of the disclosure.

As shown in FIG. 3, the disclosure also provides an energy storage device comprising a first liquid inlet pipe 2, a phase-change energy storage tank 1, and a first liquid outlet pipe 3. The first liquid inlet pipe 2, the phase-change energy storage tank 1, and the first liquid outlet pipe 3 are connected to each other sequentially to form an energy storage unit. The first liquid inlet pipe 2 is provided with a first electric valve D1. The first liquid outlet pipe 3 is provided with a second electric valve D4, a first intelligent temperature control sensor D2, and a circulating water pump D3. The first liquid inlet pipe 2 is connected to the liquid inlet 13 of the phase-change energy storage tank to supply cold/hot water to the phase-change energy storage tank, and the first liquid outlet pipe 3 is connected to the liquid outlet 14 of the phase-change energy storage tank to receive cold/hot water flowing out of the phase-change energy storage tank. The first intelligent temperature control sensor D2 is configured to control the switch on/off of the first electric valve and the second electric valve. The energy storage device further comprises a second liquid inlet pipe 4 and a second liquid outlet pipe 5. The second liquid inlet pipe 4, the phase-change energy storage tank 1, and the second liquid outlet pipe 5 are connected to each other sequentially to form an energy supply unit. The second liquid inlet pipe 4 is provided with a third electric valve C1, and the second liquid outlet pipe 5 is provided with a fourth electric valve C2. The second liquid inlet pipe 4 is connected to the liquid inlet 13 of the phase-change energy storage tank. The second liquid outlet pipe 5 is connected to the liquid outlet 14 of the phase-change energy storage tank. That is to way, in the energy supply stage, the phase-change energy storage tank supplies liquid to the second liquid inlet pipe 4 via the liquid inlet 13, and the liquid in the second liquid outlet pipe 5 flows back to the phase-change energy storage tank via the liquid outlet 14. In certain embodiments, a pipeline 6 is disposed between the second liquid inlet pipe 4 and the second liquid outlet pipe 5. The third electric valve C1 and the fourth electric valve C2 are disposed between the pipeline 6 and the phase-change energy storage tank 1. The pipeline 6 is provided with a second intelligent temperature control sensor A1 and a fifth electric valve B1. The second intelligent temperature control sensor A1 is configured to control the switch on/off of the third electric valve, the fourth electric valve C2, and the fifth electric valve B1.

The disclosure further provides a method of energy storage and supply using the energy storage device, the method comprising:

1) energy storage: setting a temperature value F1, switching off the third electric valve C1 and the fourth electric valve C2, switching on the first electric valve D1, the second electric valve D4, and the circulating water pump D3, allowing cold/hot water in the first liquid inlet pipe 2 to enter the energy storage device where the cold/hot water exchanges heat energy with the phase change material in the second housing 12; sensing, by the first intelligent temperature control sensor D2, a liquid temperature in the first liquid outlet pipe 3, and when the liquid temperature reaches the temperature value F1, switching off the first electric valve D1, the second electric valve D4, and the circulating water pump D3, whereby the heat energy is stored in the phase-change energy storage tank 1;

2) energy supply: setting a first temperature value F2 and a second temperature value F3 where F3 is larger than F2; sensing, by the second intelligent temperature control sensor A1, a liquid temperature in the pipeline 6, when the liquid temperature is less than the first temperature value F2, switching on the fifth electric valve B1, whereby the pipeline 6, the second liquid inlet pipe 4, and the second liquid outlet pipe 5 form a bypass circulation path to supply heat energy for an electrical appliance; when the second intelligent temperature control sensor A1 senses the liquid temperature in the pipeline is larger than the second temperature value F3, switching off the fifth electric valve B1, and switching on the third electric valve C1 and the fourth electric valve C2, whereby the phase-change energy storage tank 1, the second liquid inlet pipe 4, and the second liquid outlet pipe 5 form a primary circulation path to supply heat energy for the electrical appliance. For example, the first temperature value F2 is 12° C. and the second temperature value F3 is 18° C., when the liquid temperature in the pipeline is less than 12° C., the fifth electric valve B1 is switched on, and the third electric valve C1 and the fourth electric valve C2 are switched off; when the liquid temperature in the pipeline is larger than 18° C., the fifth electric valve B1 is switched off, and the third electric valve C1 and the fourth electric valve C2 are switched on, until the heat energy in the phase-change energy storage tank 1 is released completely.

It will be obvious to those skilled in the art that changes and modifications may be made, and therefore, the aim in the appended claims is to cover all such changes and modifications.

What is claimed is:

1. An energy storage device, comprising:
  a phase-change energy storage tank, the phase-change energy storage tank comprising a first housing and a second housing disposed in the first housing; the second housing comprising a liquid inlet, a liquid outlet, a feeding hole, and a discharge hole; the first housing comprising a thermal insulation material, and the second housing comprising a phase change material; the liquid inlet and the liquid outlet being disposed on two ends of the second housing, respectively; the phase change material being introduced to and being discharged out of the second housing via the feeding hole and the discharge hole, respectively;
  a first liquid inlet pipe;
  a first liquid outlet pipe;

a second liquid inlet pipe;
a second liquid outlet pipe; and
a pipeline;
wherein:
- the first liquid inlet pipe, the phase-change energy storage tank, and the first liquid outlet pipe are connected to each other sequentially to form an energy storage unit;
- the first liquid inlet pipe is provided with a first electric valve; the first liquid outlet pipe is provided with a second electric valve, a first intelligent temperature control sensor, and a circulating water pump;
- the first liquid inlet pipe is connected to the liquid inlet of the phase-change energy storage tank to supply cold/hot water to the phase-change energy storage tank, and the first liquid outlet pipe is connected to the liquid outlet of the phase-change energy storage tank to receive cold/hot water flowing out of the phase-change energy storage tank;
- the first intelligent temperature control sensor is configured to control the switch on/off of the first electric valve and the second electric valve;
- the second liquid inlet pipe, the phase-change energy storage tank, and the second liquid outlet pipe are connected to each other sequentially to form an energy supply unit;
- the second liquid inlet pipe is provided with a third electric valve, and the second liquid outlet pipe is provided with a fourth electric valve;
- the second liquid inlet pipe is connected to the liquid inlet of the phase-change energy storage tank; the second liquid outlet pipe is connected to the liquid outlet of the phase-change energy storage tank; and
- the pipeline is disposed between the second liquid inlet pipe and the second liquid outlet pipe; the third electric valve and the fourth electric valve are disposed between the pipeline and the phase-change energy storage tank; the pipeline is provided with a second intelligent temperature control sensor and a fifth electric valve; the second intelligent temperature control sensor is configured to control the switch on/off of the third electric valve, the fourth electric valve, and the fifth electric valve.

2. The device of claim 1, wherein the phase-change energy storage tank further comprises a backup hole, so that when the liquid inlet breaks down, liquid is introduced to the phase-change energy storage tank via the backup hole.

3. A method for storing and supplying energy using the energy storage device of claim 1, the method comprising:
1) in an energy storage stage, setting a temperature value, switching off the third electric valve and the fourth electric valve, switching on the first electric valve, the second electric valve, and the circulating water pump, allowing cold/hot water in the first liquid inlet pipe to enter the energy storage device where the cold/hot water exchanges heat energy with the phase change material in the second housing; sensing, by the first intelligent temperature control sensor, a liquid temperature in the first liquid outlet pipe, and when the liquid temperature reaches the temperature value, switching off the first electric valve, the second electric valve, and the circulating water pump, whereby the heat energy is stored in the phase-change energy storage tank; and
2) in an energy supply stage, setting a first temperature value and a second temperature value where the second temperature value is larger than the first temperature value; sensing, by the second intelligent temperature control sensor, a liquid temperature in the pipeline, when the liquid temperature is less than the first temperature value, switching on the fifth electric valve, whereby the pipeline, the second liquid inlet pipe, and the second liquid outlet pipe form a bypass circulation path to supply heat energy for an electrical appliance; when the second intelligent temperature control sensor senses the liquid temperature in the pipeline is larger than the second temperature value, switching off the fifth electric valve, and switching on the third electric valve and the fourth electric valve, whereby the phase-change energy storage tank, the second liquid inlet pipe, and the second liquid outlet pipe form a primary circulation path to supply heat energy for the electrical appliance.

4. The device of claim 1, wherein the first temperature value is 12° C. and the second temperature value is 18° C.

\* \* \* \* \*